(12) United States Patent
Sugiura

(10) Patent No.: US 11,303,866 B2
(45) Date of Patent: Apr. 12, 2022

(54) IMAGE ADJUSTMENT SYSTEM AND IMAGE ADJUSTMENT DEVICE

(71) Applicant: Panasonic Intellectual Property Management Co., Ltd., Osaka (JP)

(72) Inventor: Yoshinao Sugiura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/200,197

(22) Filed: Mar. 12, 2021

(65) Prior Publication Data

US 2021/0314540 A1    Oct. 7, 2021

(30) Foreign Application Priority Data

Apr. 1, 2020  (JP) .............................. JP2020-066089

(51) Int. Cl.
*G03B 21/14* (2006.01)
*H04N 9/31* (2006.01)

(52) U.S. Cl.
CPC ........... *H04N 9/3194* (2013.01); *G03B 21/14* (2013.01); *H04N 9/3147* (2013.01); *H04N 9/3185* (2013.01)

(58) Field of Classification Search
CPC ...... G03B 21/00; G03B 21/14; G03B 21/147; H04N 9/31; H04N 9/3194; H04N 9/3147; H04N 9/3185
USPC ..................................................... 353/69, 94
See application file for complete search history.

(56) References Cited

U.S. PATENT DOCUMENTS

| | | | |
|---|---|---|---|
| 6,456,339 B1* | 9/2002 | Surati | G03B 37/04 348/744 |
| 6,709,116 B1 | 3/2004 | Raskar et al. | |
| 6,733,138 B2* | 5/2004 | Raskar | H04N 9/12 345/32 |
| 2008/0136976 A1 | 6/2008 | Ajito et al. | |
| 2014/0226167 A1* | 8/2014 | Smith | H04N 9/3147 356/614 |
| 2014/0285524 A1 | 9/2014 | Koyama | |
| 2016/0112689 A1 | 4/2016 | Okamoto | |

FOREIGN PATENT DOCUMENTS

| | | |
|---|---|---|
| JP | 2004-288181 | 10/2004 |
| JP | 2010-170048 | 8/2010 |
| JP | 2014-186203 | 10/2014 |

(Continued)

*Primary Examiner* — William C. Dowling
(74) *Attorney, Agent, or Firm* — Wenderoth, Lind & Ponack, L.L.P.

(57) ABSTRACT

An image adjustment system includes: a plurality of image projection devices that respectively project a plurality of images in a plurality of projection ranges; an imaging device that captures a region containing the plurality of projection ranges to obtain a captured image; and a controller that controls the plurality of image projection devices and the imaging device. The controller calculates first rotation information representing an orientation of each of the plurality of images with respect to a first reference orientation of the captured image and adjusts display of each of the plurality of images based on the first rotation information to cause the orientation and the first reference orientation to be in a predetermined relation with each other.

8 Claims, 16 Drawing Sheets

(56) References Cited

FOREIGN PATENT DOCUMENTS

| | | |
|---|---|---|
| JP | 2016-177121 | 10/2016 |
| JP | 2017-116950 | 6/2017 |
| JP | 2018-54763 | 4/2018 |
| WO | 2006/025191 | 3/2006 |

* cited by examiner

| Projector | Conversion information | First rotation information PR |
|---|---|---|
| 11 | H1 | 102 degrees |
| 12 | H2 | 15 degrees |
| 13 | H3 | 5 degrees |

| Second rotation information CR | -10 degrees |
|---|---|

IMAGE ADJUSTMENT SYSTEM AND IMAGE ADJUSTMENT DEVICE

BACKGROUND

1. Technical Field

The present disclosure relates to an image adjustment system and an image adjustment device.

2. Description of the Related Art

The projector disclosed in Patent Literature 1 detects the angle at which an image should be rotated or tilted, and rotates the image at the detected angle while maintaining the aspect ratio of the image signal, thereby projecting the image on a screen.

Patent Literature 1 is Japanese Unexamined Patent Application Publication No. 2010-170048.

SUMMARY

Patent Literature 1 is susceptible to improvement in the workability of image adjustment when a plurality of image projection devices are used together.

In view of the above, an object of the present disclosure is to provide an image adjustment system and an image adjustment device with improved workability of image adjustment when the system or the device includes a plurality of image projection devices.

The image adjustment system according to the present disclosure includes: a plurality of image projection devices that respectively project a plurality of images in a plurality of projection ranges; an imaging device that captures a region containing the plurality of projection ranges to obtain a captured image; and a controller that controls the plurality of image projection devices and the imaging device. The controller calculates first rotation information representing an orientation of each of the plurality of images with respect to a first reference orientation of the captured image and adjusts display of each of the plurality of images based on the first rotation information to cause the orientation and the first reference orientation to be in a predetermined relation with each other.

The image adjustment device according to the present disclosure is a device for adjusting display of each of a plurality of images respectively projected in a plurality of projection ranges by a plurality of image projection devices. The image adjustment device includes: a calculation unit that calculates first rotation information representing an orientation of each of the plurality of images with respect to a first reference orientation in a captured image, the captured image being obtained by an imaging device when the imaging device captures a region containing the plurality of projection ranges; and an image adjustment unit that adjusts, based on the first rotation information, the display of each of the plurality of images to cause the orientation and the first reference orientation to be in a predetermined relation with each other.

The present disclosure provides an image adjustment system and an image adjustment device with improved workability of image adjustment when the system or the device includes a plurality of image projection devices.

DETAILED DESCRIPTION

Figure 1:
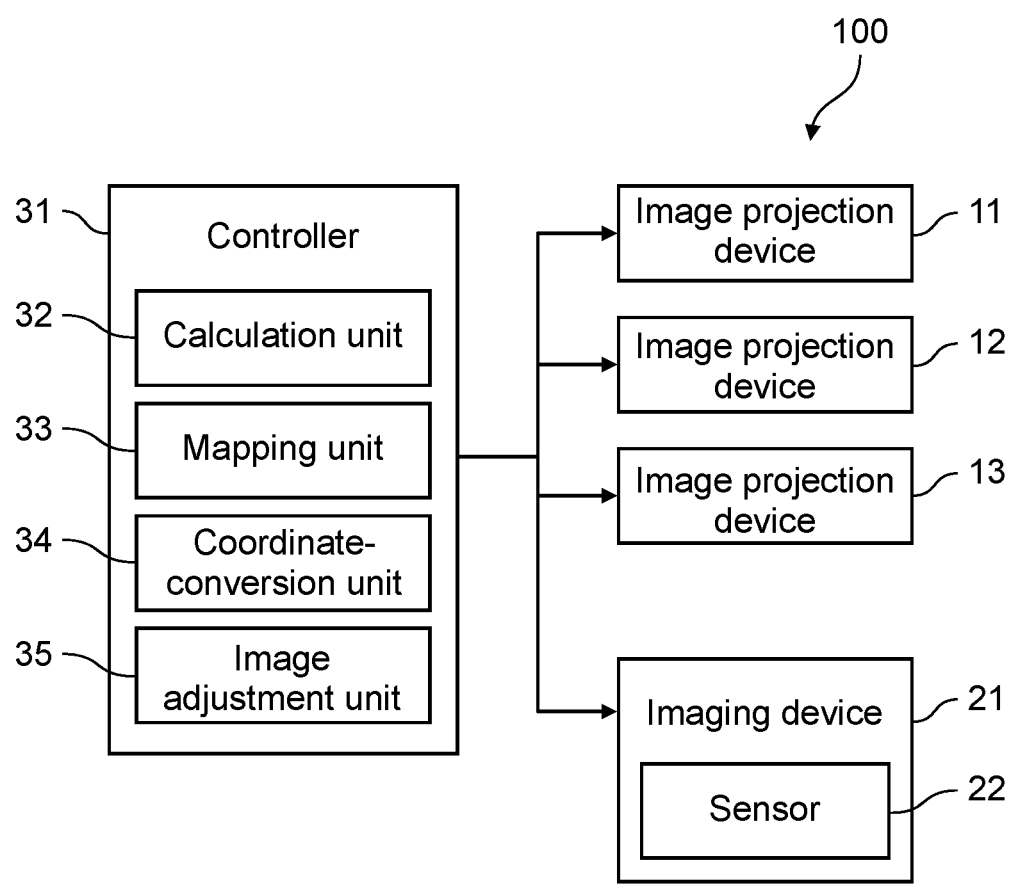
FIG. 1 is a block diagram of an image adjustment system according to a first exemplary embodiment of the present disclosure.

The Reason for which the Present Disclosure has been Made

In recent years, it is becoming more common to use a plurality of image projection devices to create a united image. The image projection devices are often placed in different orientations; for example, one image projection device may be placed in landscape orientation, and another is placed in portrait orientation. In such cases, the image projection devices, which are oriented differently, display their images in different orientations from each other. These traditional image projection devices are susceptible to improvement in the workability of image adjustment to align the orientations of their images.

To overcome this problem, the inventor of the present invention have considered adjusting the orientations of images and the direction input by a keyboard, mouse, etc., based on a certain reference such as the vertical direction in the real world. Hence, they have achieved the following invention.

The image adjustment system according to an aspect of the present disclosure includes: a plurality of image projection devices that project a plurality of images in a plurality of projection ranges; an imaging device that captures a region containing the plurality of projection ranges to obtain a captured image; and a controller that controls the plurality of image projection devices and the imaging device. The controller calculates first rotation information representing an orientation of each of the plurality of images with respect to a first reference orientation of the captured image and adjusts display of each of the plurality of images based on the first rotation information to cause the orientation and the first reference orientation to be in a predetermined relation with each other.

This structure provides an image adjustment system with improved workability of image adjustment when the system includes a plurality of image projection devices.

The controller may further perform the following: generating, based on the first rotation information, mapping information of a projector coordinates of each of the plurality of image projection devices, and a camera coordinate of the imaging device; and generating, based on the mapping information, conversion information for converting the projector coordinate into the camera coordinate.

This structure enables moving the images among the plurality of image projection devices.

The image adjustment system may further include an input device that receives input for instructing a direction. The controller may change, based on the input and the conversion information, the direction instructed by the input.

This structure can align the direction instructed by input with the direction in which an image is moved, thereby improving image visibility and the operability of the image adjustment system.

The plurality of image projection devices may include a first image projection device and a second image projection device. The plurality of projection ranges include a first projection range of the first image projection device and a second projection range of the second image projection device. The controller may further perform the following: calculating, when a partial image in the first projection range is moved outside the first projection range as a result of the input, a camera coordinate of the partial image in the imaging device based on the conversion information; searching for, based on the conversion information, one image projection device of the plurality of image projection devices, the one image projection device containing the camera coordinate of the partial image in the corresponding projection range of the plurality of projection ranges; and switching over, when the camera coordinate of the partial image is within the second projection range, display of the partial image from the first image projection device to the second image projection device.

This structure enables smooth display of images across the plurality of projection ranges of the plurality of image projection devices, thereby further improving the image visibility.

The imaging device may include a sensor that detects a tilt of the imaging device with respect to a second reference orientation different from the first reference orientation. The controller may perform the following: calculating second rotation information based on the second reference orientation and the tilt; and generating the conversion information based on the first rotation information and the second rotation information.

This structure enables displaying images in any direction, such as the vertical direction.

The controller may adjust the display of each of the plurality of images to cause the orientation and the first reference orientation agree with each other.

This structure can align the orientation to display the images projected by the plurality of image projection devices so as to create a united image, thereby further improving the image visibility.

The image adjustment device according to an aspect of the present disclosure is a device for adjusting display of each of a plurality of images respectively projected in a plurality of projection ranges by a plurality of image projection devices. The image adjustment device includes: a calculation unit that calculates first rotation information representing an orientation of each of the plurality of images with respect to a first reference orientation in a captured image, the captured image being obtained by an imaging device when the imaging device captures a region containing the plurality of projection ranges; and an image adjustment unit that adjusts, based on the first rotation information, display of each of the plurality of images to cause the orientation and the first reference orientation to be in a predetermined relation with each other.

This structure improves the workability of image adjustment when the image adjustment device includes a plurality of image projection devices.

The image adjustment device may further include: a mapping unit that generates, based on the first rotation information, mapping information of a projector coordinate of each of the plurality of image projection devices and a camera coordinate of the imaging device; and a coordinate-conversion unit that generates, based on the mapping information, conversion information for converting the projector coordinate into the camera coordinate.

This structure enables moving the images across the plurality of projection ranges of the plurality of image projection devices.

Exemplary embodiments will now be described with reference to the attached drawings.

First Exemplary Embodiment

Figure 2:
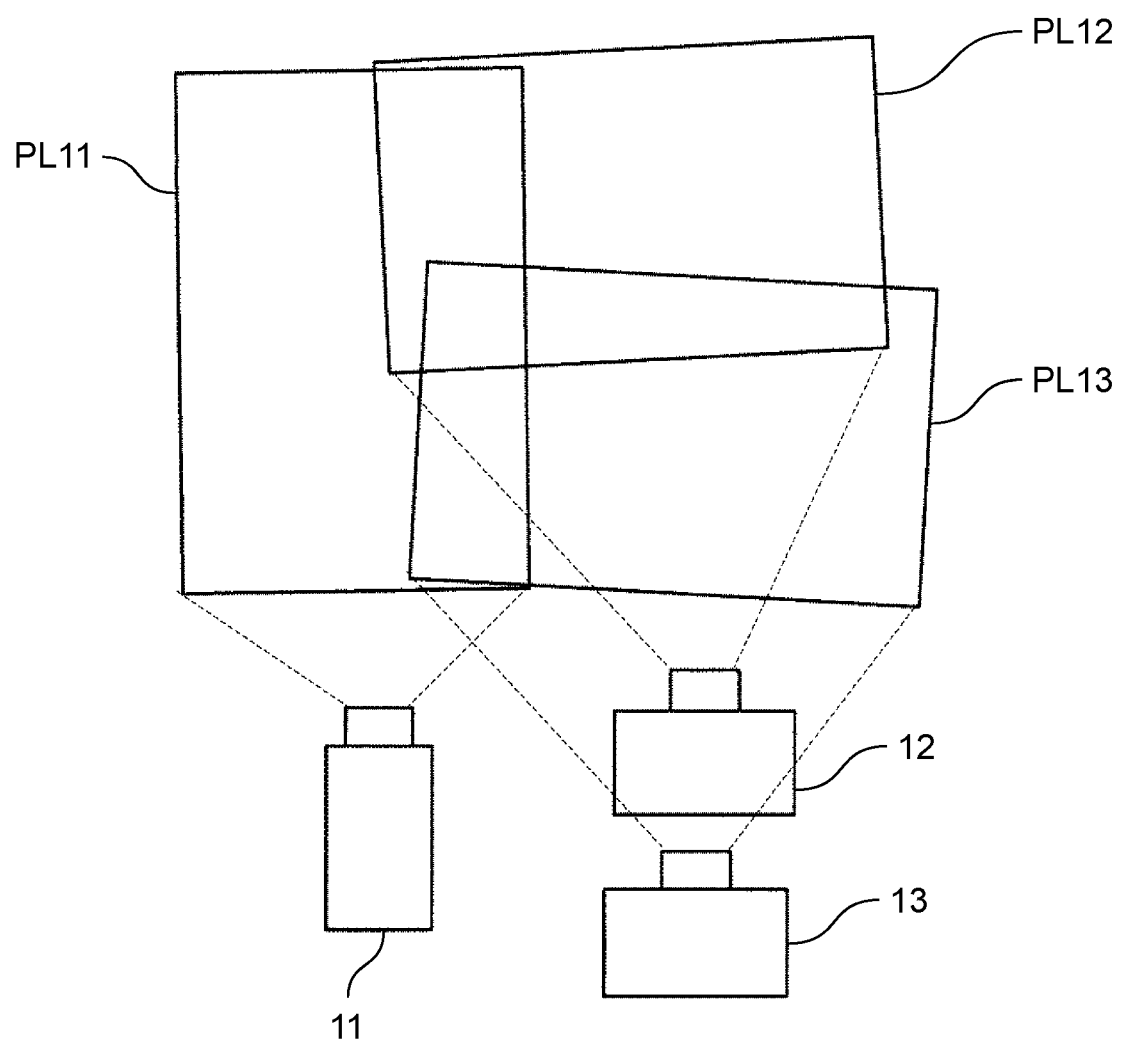
FIG. 2 is a schematic diagram of image projection devices of the image adjustment system shown in FIG. 1 and the projection ranges of the image projection devices.
Figure 3:
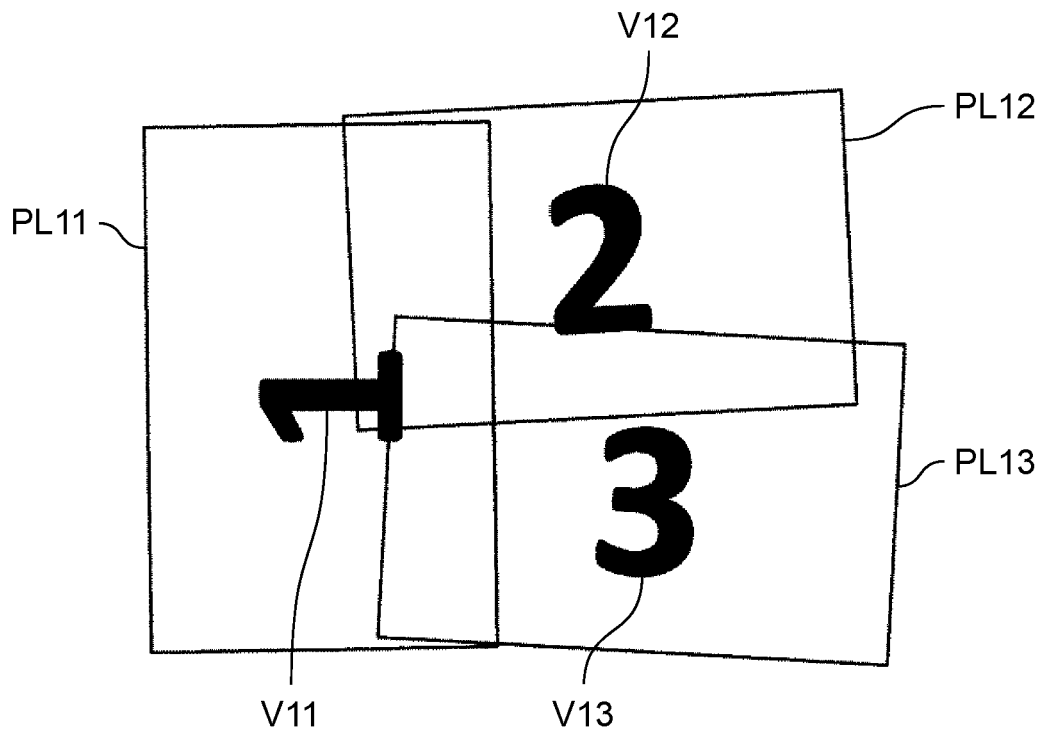
FIG. 3 is a schematic diagram of images that have been projected by the image projection devices and have not yet been adjusted by image adjustment system shown in FIG. 1.
Figure 4:
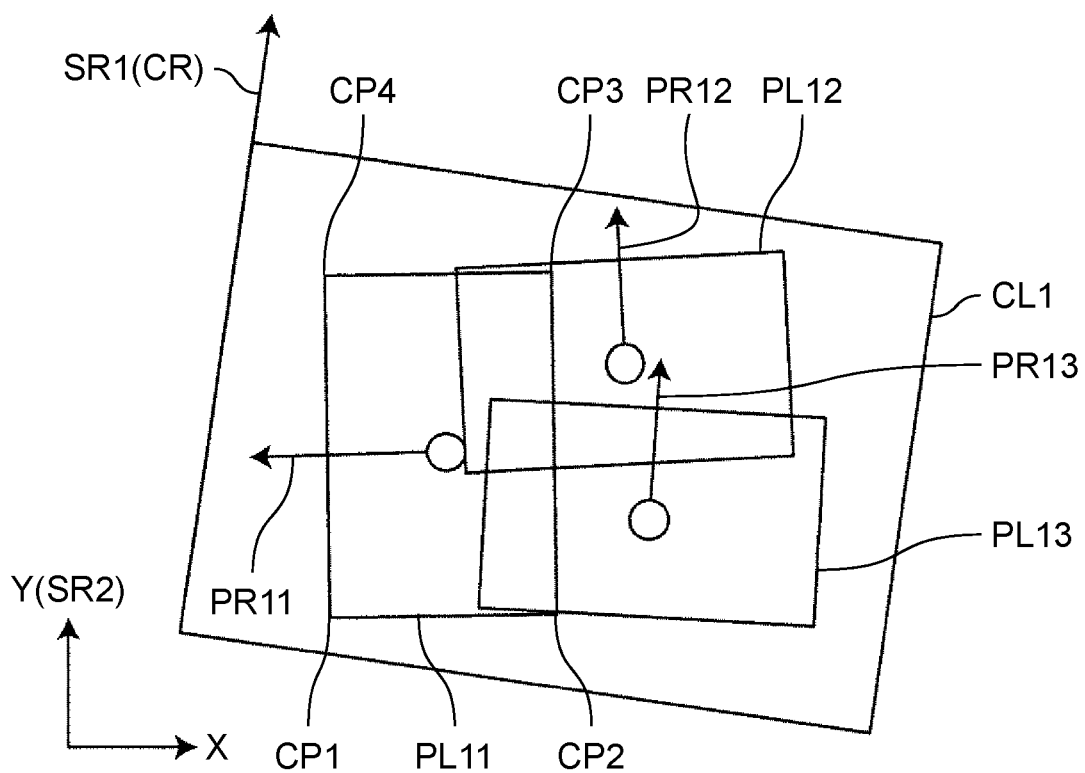
FIG. 4 is a schematic diagram to explain image adjustment performed by the image adjustment system shown in FIG. 1.

FIG. 1 is a block diagram of image adjustment system 100 according to a first exemplary embodiment of the present disclosure. FIG. 2 is a schematic diagram of image projection devices 11 to 13 of system 100 and projection ranges PL11 to PL13 of image projection devices 11 to 13, respectively. FIG. 3 is a schematic diagram of images V11 to V13 that have been projected by image projection devices 11 to 13, respectively, and have not yet been adjusted by system 100. FIG. 4 is a schematic diagram to explain image adjustment performed by system 100. In FIG. 4, X and Y represent the horizontal and vertical directions, respectively.

Overall Structure

As shown in FIG. 1, image adjustment system 100 includes three image projection devices 11, 12, and 13, imaging device 21, and controller 31.

Image Projection Devices

Image projection devices 11, 12, and 13 (e.g., projectors) each project an image based on a received image signal. These image projection devices 11 to 13 can transmit and receive data, such as an image signal, or information to and from controller 31, which will be described later. Image projection devices 11 to 13 each create an image based on an image signal received from controller 31, and emit light (e.g., visible light) to project the image on a projection surface, such as a screen or wall surface. These image projection devices 11 to 13 are placed so that the light can be emitted to the projection surface.

According to the present exemplary embodiment, a united image can be created by three image projection devices 11 to 13. As shown in FIG. 2, a united image that is larger than the total area of the projection ranges PL11, PL12, and PL13 can be created by image projection devices 11, 12, and 13. The term "a united image" here means an image in which the images projected by image projection devices 11 to 13 are all related to each other. Such a united image may contain a plurality of images or images related to each other.

In the present exemplary embodiment, image projection devices 11 to 13 are placed in different orientations from each other. More specifically, as shown in FIG. 2, image projection device 11 is placed in portrait orientation whereas image projection devices 12 and 13 are placed in landscape orientation. Alternatively, image projection devices 11 to 13 may be placed, for example, diagonally.

Since image projection devices 11 to 13 are placed in different orientations as described above, images V11 to V13 projected by image projection devices 11 to 13 are also displayed in different orientations from each other as shown in FIG. 3.

Imaging Device

An imaging device is a device for capturing still or moving images. Imaging device 21 captures a region containing the projection ranges PL11, PL12, and PL13 to obtain a captured image CL1 shown in FIG. 4. Imaging device 21 can transmit and receive data or information to and from controller 31. Imaging device 21 is oriented toward the projection surface onto which images are projected by image projection devices 11 to 13. Imaging device 21 includes sensor 22 for detecting the tilt of device 21 with respect to a second reference orientation SR2, which will be described later. Sensor 22 can be, for example, a gyro sensor for detecting angles. In the present exemplary embodiment, the second reference orientation SR2 is defined as the Y orientation.

Controller

Controller 31 controls three image projection device 11 to 13 and imaging device 21. In the present exemplary embodiment, controller 31 includes calculation unit 32, mapping unit 33, coordinate-conversion unit 34, and image adjustment unit 35.

Calculation unit 32 calculates first rotation information PR11, PR12, and PR13. First rotation information PR11, PR12, and PR13 represents the orientations of image projection device 11, 12, and 13, respectively, with respect to a first reference orientation SR1 in the captured image CL1. First rotation information PR11, PR12, and PR13 may be collectively referred to as first rotation information PR. The first reference orientation SR1 is the reference orientation of the camera coordinates in the captured image CL1. In the present exemplary embodiment, the first reference orientation SR1 is shown by the arrow along one side of the captured image CL1 shown in FIG. 4. The first rotation information PR11 to PR13 represents the angles of the images V11 to V13, respectively, with reference to the first reference orientation SR1.

Mapping unit 33 generates, based on the first rotation information PR11 to PR13, the mapping information between the projector coordinates of image projection device 11 to 13 and the camera coordinates of imaging device 21. The projector coordinates represent coordinates in the projection ranges PL11 to PL13 of image projection devices 11 to 13. The camera coordinates represent coordinates in the captured image CL1 of imaging device 21. The mapping information generated by mapping unit 33 indicates the correspondence between the projector coordinates of image projection devices 11 to 13 and the camera coordinates.

Calculation unit 32 may alternatively calculate second rotation information CR of imaging device 21 with respect to the second reference orientation SR2. The second reference orientation SR2 is the reference orientation of the observer of images V11 to V13. In the present exemplary embodiment, the second reference orientation SR2 is defined as the Y orientation, and the second rotation information CR indicates the angle of the first reference orientation SR1 with respect to the Y orientation.

Coordinate-conversion unit 34 generates conversion information which converts projector coordinates of image projection devices 11 to 13 into camera coordinates of imaging device 21 so that a predetermined relation is established between the orientations of the images V11 to V13 and the first reference orientation SR1. The predetermined relation means, for example, that the orientations of the images V11 to V13 agree with the first reference orientation. The predetermined relation may alternatively mean that the orientations of the images have a fixed angle with respect to the first reference orientation.

Figure 9:
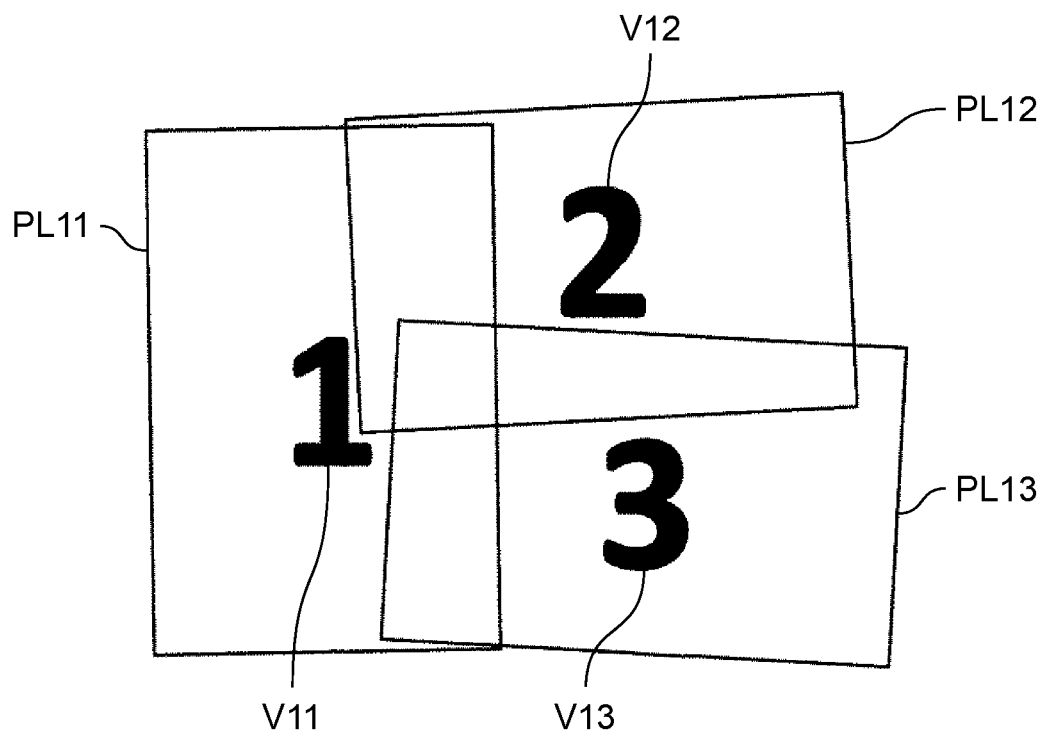
FIG. 9 is a schematic diagram of the images rotated through the processes shown in FIG. 8.

Image adjustment unit 35 adjusts, based on the conversion information, the orientations of the images V11 to V13 to be displayed. For example, the images V11 to V13 are displayed in different orientations as shown in FIG. 3. However, their orientations can be aligned with each other as shown in FIG. 9 by converting the coordinates of the images V11 to V13 based on conversion information.

Controller 31 includes a general-purpose processor, such as a CPU or an MPU, for executing a program and achieving a predetermined function. Controller 31 invokes a control program stored in an unillustrated storage and executes the program so as to achieve the functions of the above-mentioned calculation unit, mapping unit, coordinate-conversion unit, and image adjustment unit, thereby functioning as an image adjustment device. Controller 31 is not limited to a device for achieving predetermined functions through the cooperation of hardware and software and may alternatively be a hardware circuit designed only for specific functions. More specifically, controller 31 can be achieved by various types of processors, such as a CPU, an MPU, a GPU, an FPGA, a DSP, or an ASIC.

Operations

Figure 5:
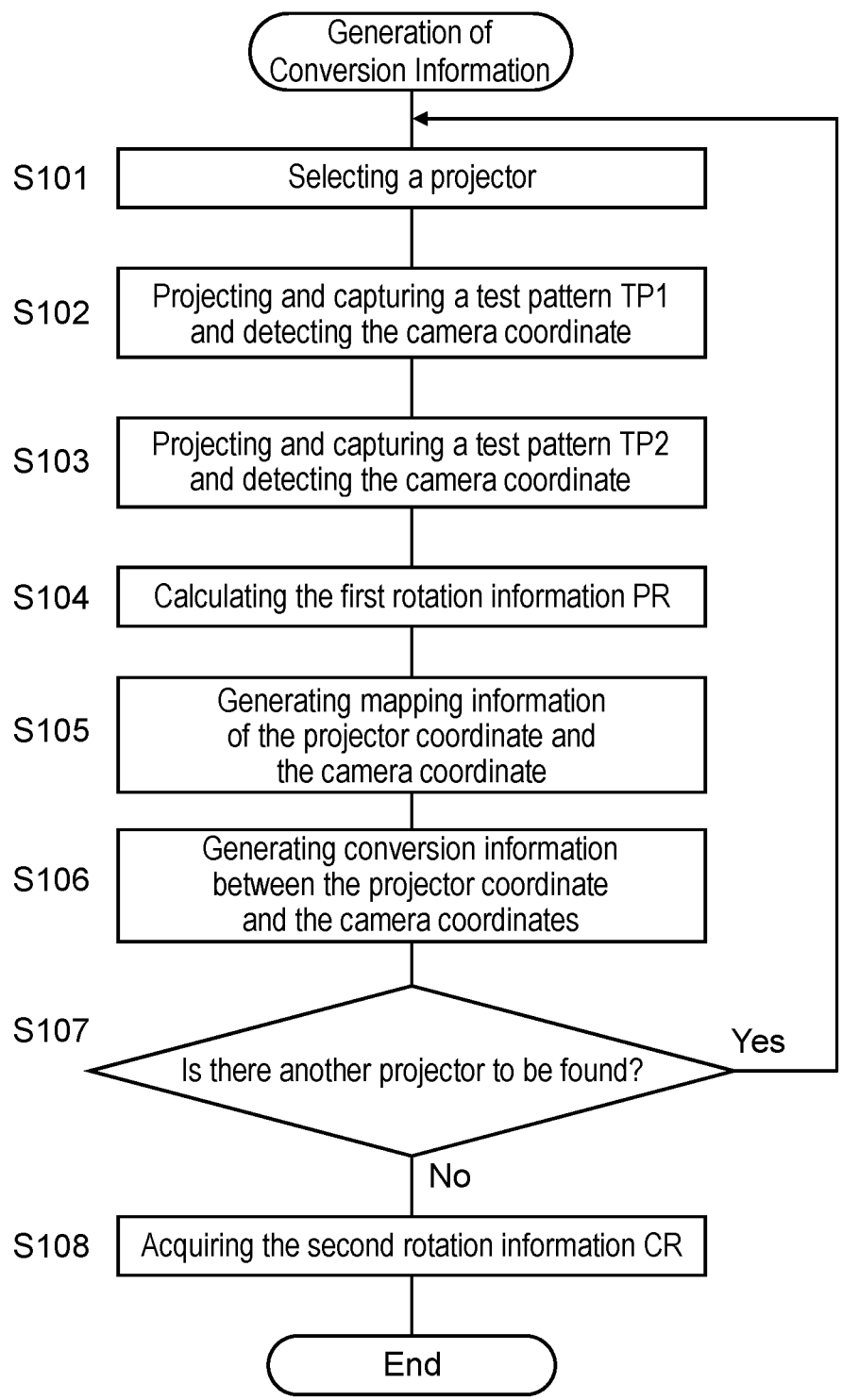
FIG. 5 is a flowchart illustrating a method of calculating conversion information in each image projection device.
Figure 6A:
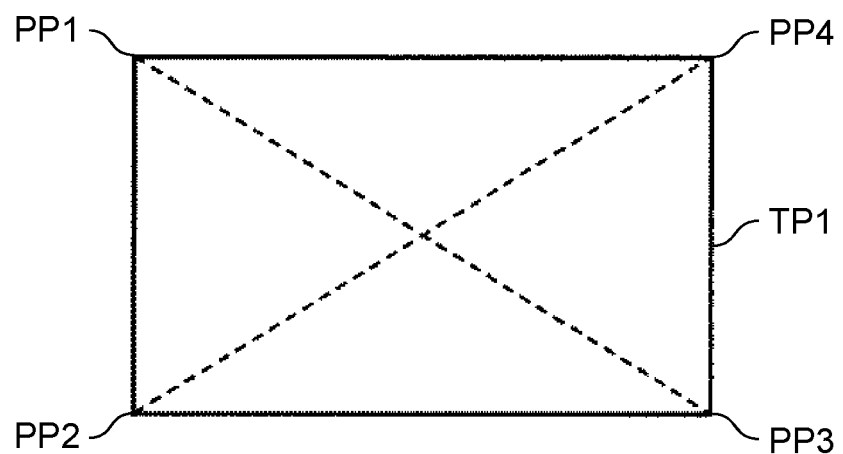
FIG. 6A shows a test pattern used to calculate first rotation information.
Figure 6B:
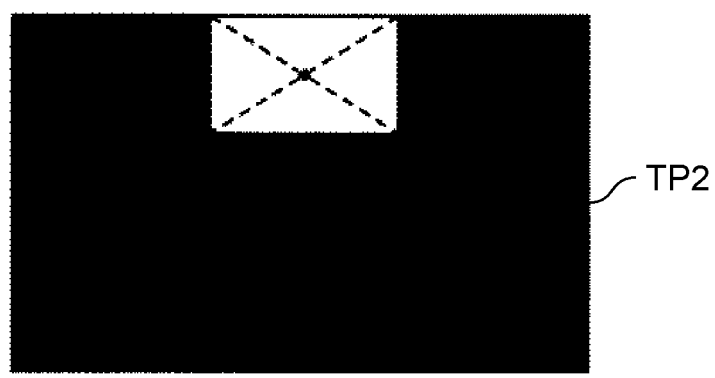
FIG. 6B shows another test pattern used to calculate the first rotation information.
Figure 6C:
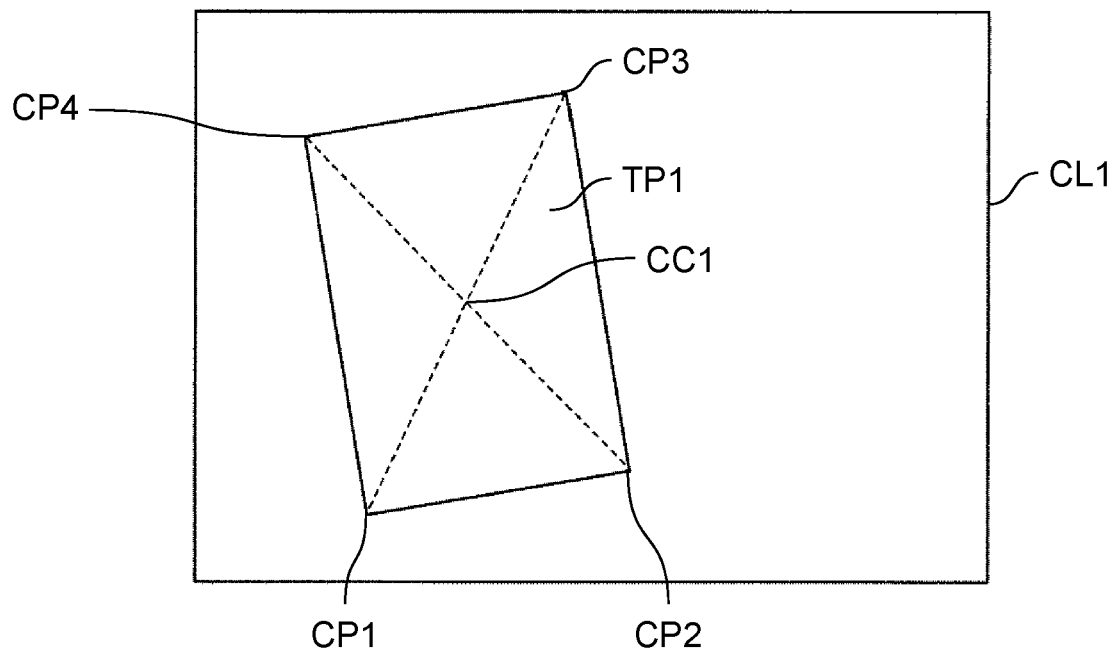
FIG. 6C shows an image obtained when an image projection device projects, as an image, the test pattern shown in FIG. 6A and an imaging device captured the image.
Figure 6D:
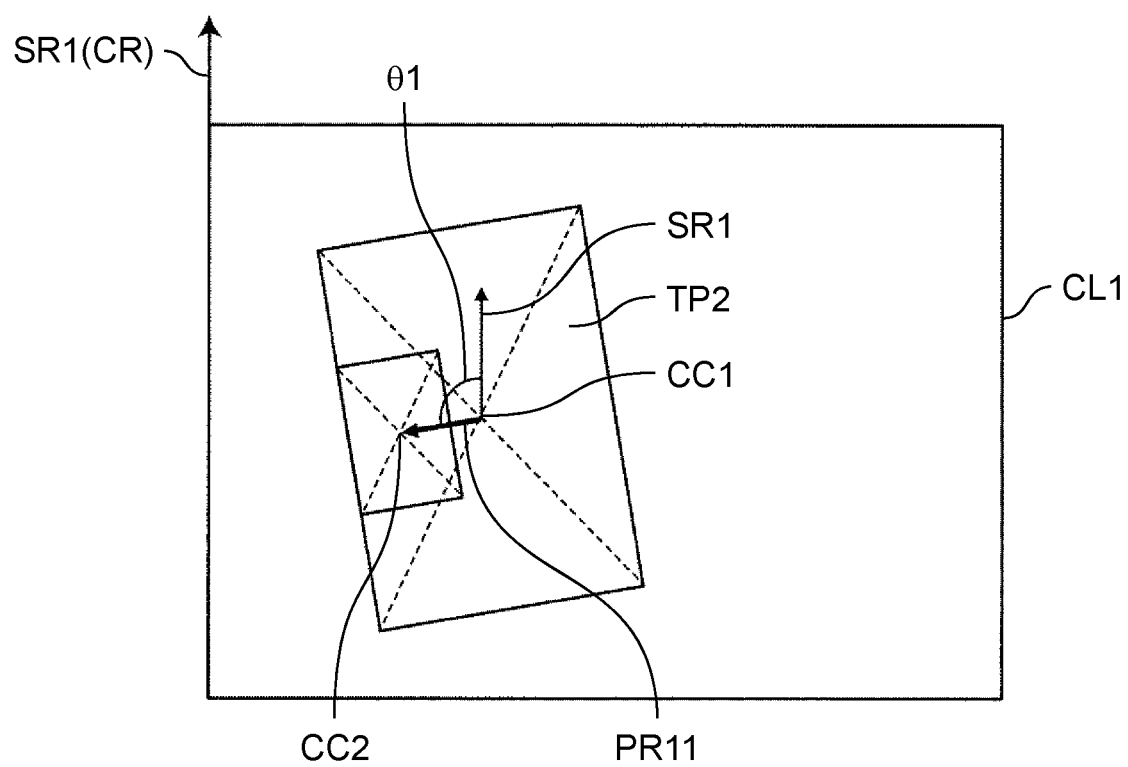
FIG. 6D shows an image obtained when the image projection device projects, as an image, the test pattern shown in FIG. 6B and the imaging device captures the image.
Figures 7, 8:
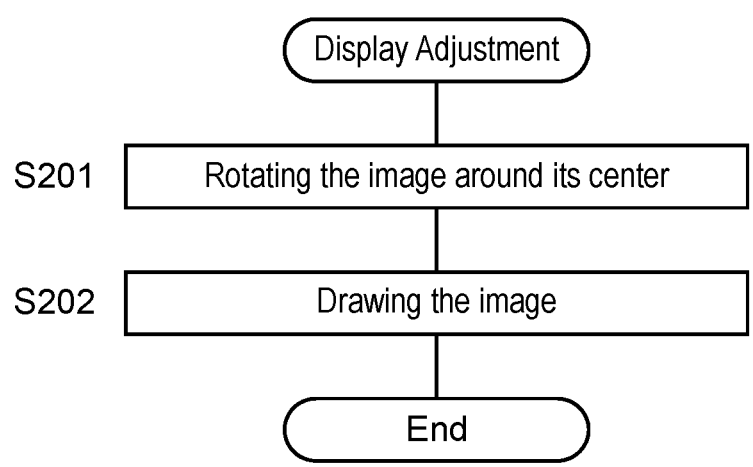
FIG. 7 is a table containing the first rotation information of the image projection devices and the second rotation information of the imaging device.
FIG. 8 is a flowchart describing how each image projection device displays an image based on the conversion information.

Operations of image adjustment system 100 structured as above will now be described with reference to FIGS. 3 to 9. FIG. 5 is a flowchart illustrating a method of calculating rotation information in image projection device 11 to 13 and generating conversion information. FIG. 6A shows a test pattern TP1 used to calculate first rotation information PR11 to PR13. FIG. 6B shows another test pattern TP2 used to calculate the first rotation information PR11 to PR13. FIG. 6C shows a captured image CL1 obtained when image projection device 11 projects, as an image, the test pattern TP1 shown in FIG. 6A and imaging device 21 captures the image. FIG. 6D shows a captured image CL1 obtained when image projection device 11 projects, as an image, the test pattern TP2 shown in FIG. 6B and imaging device 21 captures the image. FIG. 7 is a table containing the first rotation information PR11 to PR13 of image projection devices 11 to 13 and the second rotation information CR of imaging device 21. FIG. 8 is a flowchart describing how image projection device 11 to 13 display the images V11 to V13 based on the conversion information. FIG. 9 is a schematic diagram of the images V11 to V13 rotated through the processes shown in FIG. 8. The calculation of rotation information and the generation of conversion information will now be described with reference to the flowchart of FIG. 5 and to FIGS. 6A to 9.

Calculation of Rotation Information

Controller 31 calculate the first rotation information PR11 to PR13 of image projection device 11 to 13, respectively, and acquires the second rotation information CR of imaging device 21.

As shown in the flowchart of FIG. 5, controller 31 selects one of image projection device 11 to 13 (Step S101). The following description is based on the assumption that image projection device 11 is selected in Step S101; however, steps S102 to S107 will be performed in the same manner when image projection device 12 or 13 is selected instead.

Image projection device 11 projects the test pattern TP1 shown in FIG. 6A, and imaging device 21 captures the projected test pattern TP1. At this moment, calculation unit 32 of controller 31 detects camera coordinates CP1 to CP4 of the four corners of the pattern TP1 and a camera coordinate CC1 of the center of the pattern TP1 (see FIG. 6C) in the captured image CL1 obtained by imaging device 21 (Step S102).

Next, image projection device 11 projects the test pattern TP2 shown in FIG. 6B. In the same manner as in Step S101, imaging device 21 captures the projected image. At this moment, calculation unit 32 of controller 31 detects a camera coordinate CC2 of the center of the test pattern TP2 (see FIG. 6D) in the captured image CL1 obtained by imaging device 21 (Step S103).

Calculation unit 32 calculates the first rotation information PR11 from the spatial relationship between the camera coordinate CC1 of the center of the pattern TP1, and the camera coordinate CC2 of the center of the pattern TP2 (Step S104). In this case, as shown in FIG. 6D, the first rotation information PR11 is a vector extending from the camera coordinate CC1 of the center of the pattern TP1 to the camera coordinate CC2 of the center of the pattern TP2. Hence, the first rotation information PR11 represents the angle θ1 of the image V11 projected by image projection device 11 with respect to the first reference orientation SR1. In other words, the first rotation information PR11 indicates how much the image V11 projected by image projection device 11 is tilted from the upward orientation (the first reference orientation SR1) of the camera coordinates. Note that the first reference orientation SR1 can be selected according to the orientation in which the image V11 is desired to be displayed, such as the upward orientation in the imaging range of imaging device 21.

In the present exemplary embodiment, the first rotation information PR11 is 102° as shown in the table of FIG. 7. This indicates that the image V11 is tilted by 102° from the first reference orientation SR1 shown in FIG. 4.

Generation of Conversion Information

Next, mapping unit 33 of controller 31 generates, based on the first rotation information PR11, mapping information between projector coordinates of image projection device 11 and camera coordinates of imaging device 21 (Step S105). To be more specific, mapping unit 33 finds, based on the first rotation information PR11, the correspondence between the projector coordinates PP1 to PP4 of the four corners of the test pattern TP1 (see FIG. 4), and the camera coordinates CP1 to CP4 of the four corners of the test pattern TP1. The mapping information between the projector coordinates and the camera coordinates can be, for example, information for mapping between the projector coordinates PP1 to PP4 and the camera coordinates CP1 to CP4. For example, when the mapping information between four or more camera coordinates and four or more projector coordinates are obtained, such as the four corners of the test pattern TP1, conversion information can be generated as will be described later to convert projector coordinates to or from camera coordinates.

Coordinate-conversion unit 34 of controller 31 generates, based on the mapping information, conversion information H1. The conversion information H1 converts projector coordinates of the projection range PL11 of image projection device 11 into camera coordinates (Step S106). The conversion information can be, for example, the conversion matrix of projector coordinates and camera coordinates.

When the conversion information H1 is generated, controller 31 determines whether there is another image projection device for which conversion information has not yet been generated (Step S107). When such an image projection device exists (Yes in Step S107), the process returns to Step S101 and the same processes as Steps S101 to S106 are performed for the image projection device. Meanwhile, when there is no image projection device for which conversion information has not yet been generated (No in Step S107), the process proceeds to Step S108.

Thus, Steps S102 to S106 are also applied to image projection devices 12 and 13. This results in the generation of first rotation information PR12 and PR13, and conversion information H2 and H3 for image projection devices 12 and 13, respectively, as shown in the table of FIG. 7. Note that the generation of the mapping information and the conversion information H1 to H3 is not essential, so that Steps S105 and S106 are dispensable. The conversion information H1 to H3 is used for the below-mentioned switchover of the display of a pointer or other symbols among image projection devices 11 to 13.

Calculation unit 32 acquires the second rotation information CR of imaging device 21 through the gyro sensor mounted in imaging device 21 (Step S108). The second rotation information CR represents, for example, the angle of imaging device 21 with respect to the vertically upward orientation (the Y orientation). The second rotation information CR in the present exemplary embodiment is −10° as shown in the table of FIG. 7.

Displaying the Images

Image projection devices 11 to 13 rotate and display their images V11 to V13 based on the first rotation information PR11 to PR13, respectively, and the second rotation information CR. The following describes the processes performed only by image projection device 11 with reference to the flowchart of FIG. 8, but the same processes are performed by image projection devices 12 and 13.

Upon calculation of the first rotation information PR11 and the second rotation information CR, image adjustment unit 35 of controller 31 rotates the image V11 projected by image projection device 11 (Step S201). In the present exemplary embodiment, the image V11 is rotated at an angle of (CR−PR11) based on the first rotation information PR11 and the second rotation information CR. After being rotated at an angle of −112°, which is the result of −10°-102°, the image V11 is displayed in the Y orientation.

When the image V11 is rotated, image adjustment unit 35 draws the image V11 in the rotated orientation (Step S202).

Steps S201 to S202 are applied also to image projection devices 12 and 13. As a result, as shown in FIG. 9, the images V11 to V13 projected by image projection devices 11 to 13 are displayed in the same orientation.

Modified Example

Figure 10A:
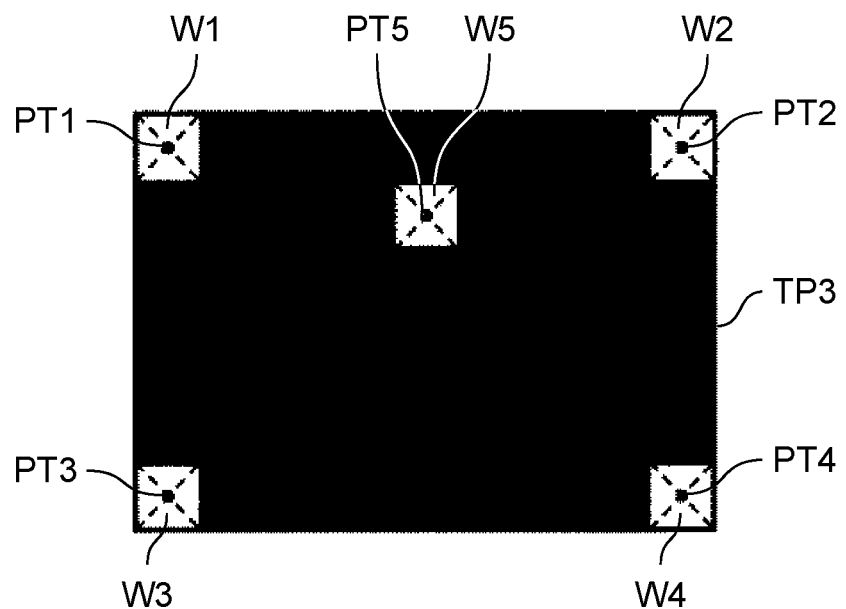
FIG. 10A is a schematic diagram of a test pattern according to a modified example of the first exemplary embodiment.
Figure 10B:
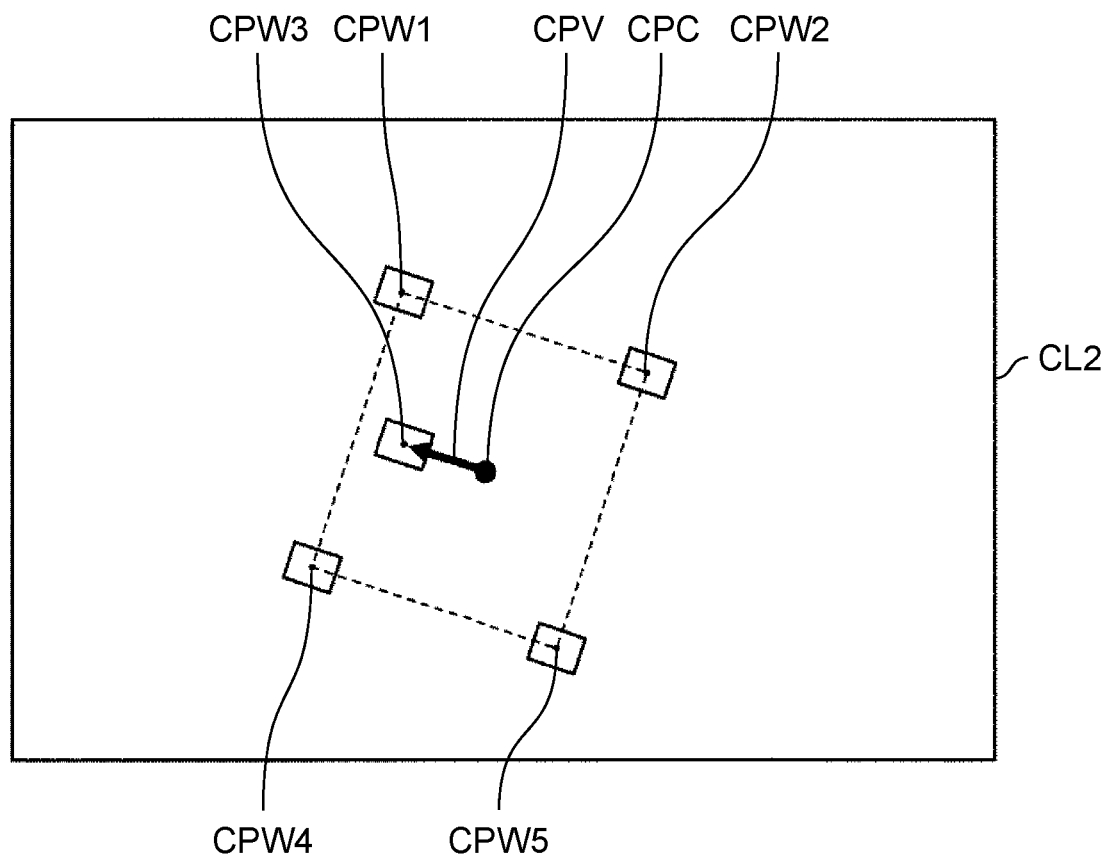
FIG. 10B shows a captured image obtained when the imaging device captures the test pattern projected by an image projection device.

FIG. 10A is a schematic diagram of a test pattern TP3 according to a modified example of the first exemplary embodiment. FIG. 10B shows a captured image CL2 obtained when imaging device 21 captures the test pattern TP3 projected by image projection device 11.

Using the test pattern TP3 shown in FIG. 10A allows the first rotation information PR to be calculated from a single test pattern. A calculation process of the first rotation information from the pattern TP3 will now be described in detail.

First, image projection device 11 projects the test pattern TP3, and imaging device 21 captures the projected pattern TP3. As shown in FIG. 10A, the pattern TP3 has five white regions W1 to W5. Of these regions W1 to W5, four regions W1 to W4 are placed at the four corners of the pattern TP3. The one remaining region W5 is placed above the center of the pattern TP3.

Calculation unit 32 of controller 31 detects camera coordinates CPW1 to CPW5 of the centers of the white regions W1 to W5, respectively, in the captured image CL2. Of the detected camera coordinates CPW1 to CPW5, calculation unit 32 specifies the point surrounded by the other four points. In the example shown in FIG. 10B, the coordinate CPW3 is the point surrounded by the other four points. In this case, calculation unit 32 calculates the orientation CPV of the segment connecting between the coordinate CPW3 and the center of gravity CPC of the camera coordinates CPW1, CPW2, CPW4, and CPW5 at the four corners. The orientation CPV corresponds to the first rotation information PR11.

The white regions W1 to W5 have projector coordinates PT1 to PT5, respectively, at their centers shown in FIG. 10A. Mapping unit 33 can generate the mapping information between the projector coordinates PT1 to PT4 of the four corners and the camera coordinates CPW1, CPW2, CPW4, and CPW5. Coordinate-conversion unit 34 can generate, based on the mapping information, the conversion matrix between the projector coordinates PT1 to PT4 and the camera coordinates CPW1, CPW2, CPW4, and CPW5.

Thus, a single test pattern is enough to generate necessary information.

Effects

The present exemplary embodiment thus described provides an image adjustment system with improved workability of image adjustment when the system includes a plurality of image projection devices.

The first rotation information PR11 to PR13 is calculated, which represents the tilt of the images V11 to V13, respectively, with respect to the first reference orientation SR1. By using the first rotation information PR11 to PR13, the display of the images V11 to V13 can be adjusted so that the orientations of these images V11 to V13 are in a predetermined relation with the first reference orientation SR1. Consequently, when a united image is created from the images V11 to V13 projected by image projection devices 11 to 13, the images V11 to V13 are prevented from being differently oriented, thereby improving image visibility.

The first exemplary embodiment has described using three image projection devices, but the number can be two or more. In the first exemplary embodiment, image projection device 11 is placed in portrait orientation, and image projection devices 12 and 13 are placed in landscape orientation; however, these image projection devices may be placed in other orientations.

The processes in these image projection devices may be performed either sequentially or concurrently.

The projection ranges PL11 to PL13 of image projection devices 11 to 13 contain overlapping parts in the first exemplary embodiment, but do not necessarily have to overlap.

The display of images is adjusted based on the first reference orientation SR1 and the second reference orientation SR2 in the first exemplary embodiment, but may alternatively be adjusted based on the first reference orientation SR1 alone. This enables aligning the orientations of images with the first reference orientation SR1.

The test patterns TP1 to TP3 used in the first exemplary embodiment are mere examples, and other test patterns may be used instead.

Second Exemplary Embodiment

A second exemplary embodiment will now be described with reference to FIGS. 11 to 15B. In the second exemplary embodiment, components identical to those in the first exemplary embodiment are denoted by the same reference numerals, and their description will be omitted.

Figure 11:
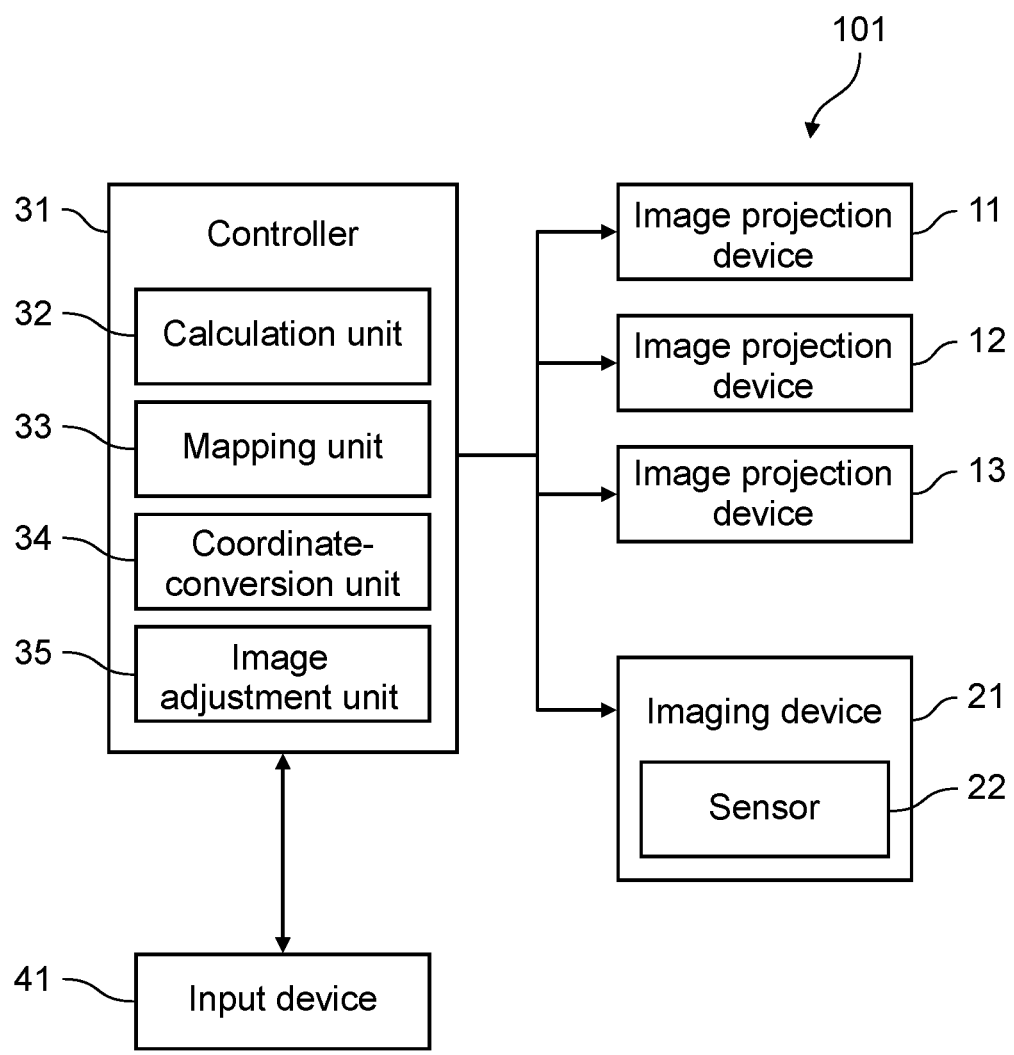
FIG. 11 is a schematic block diagram of the image adjustment system according to a second exemplary embodiment.

FIG. 11 is a schematic block diagram of image adjustment system 101 according to the second exemplary embodiment.

The second exemplary embodiment differs from the first exemplary embodiment in that image adjustment system 101 includes input device 41, and that coordinate-conversion unit 34 changes the direction in which an image is moved in response to input for instructing the direction. The "input for instructing the direction" is input for instructing the direction in which to move an image, an image, a figure, etc. that are projected by image projection devices 11 to 13.

As shown in FIG. 11, image adjustment system 101 includes input device 41, which is an input interface for receiving input from the user. Input device 41 converts an input or operation received from the user into an electrical signal and transmits the signal to controller 31. Input device 41 can be a keyboard, a mouse, a touch panel, a button etc.

When input device 41 receives input for instructing the direction by the user, controller 31 generates an image signal for moving the image to the instructed direction, and transmits the signal to at least one of image projection devices 11 to 13. Thus, input device 41 receiving input for instructing the direction allows moving the image to the direction instructed by the user.

For example, the pointer images P1 to P4 (see FIG. 13A) displayed at the four corners of a region R1 in the images projected by image projection devices 11 to 13 can be moved in response to the user input received by input device 41, thereby specifying the range of the region R1.

Assume that the user operates input device 41 to move the pointer image P1 displayed by image projection device 11 in the rightward direction. In this case, the pointer image P1 is moved in the upward direction shown in FIG. 13A because image projection device 11 is placed in portrait orientation. In the present exemplary embodiment, in order to align the direction input by the user with the direction in which the projected image is moved, the input for instructing the direction is changed based on conversion information H1 to H3 (see FIG. 7) and the input by the user.

If the pointer image P1 is moved outside the projection range PL11 of image projection device 11, a different image projection device that can display the pointer image P1 within its projection range is searched for, and the display is switched over.

Operations

Changing the Direction in which an Image is Moved

Operation to change directions performed by image adjustment system 101 will now be described with reference to FIGS. 12 to 13B. In the following description, input device 41 is a keyboard. The keyboard receives user input for instructing one of the four directions through the up, down, left, and right keys.

Figure 12:
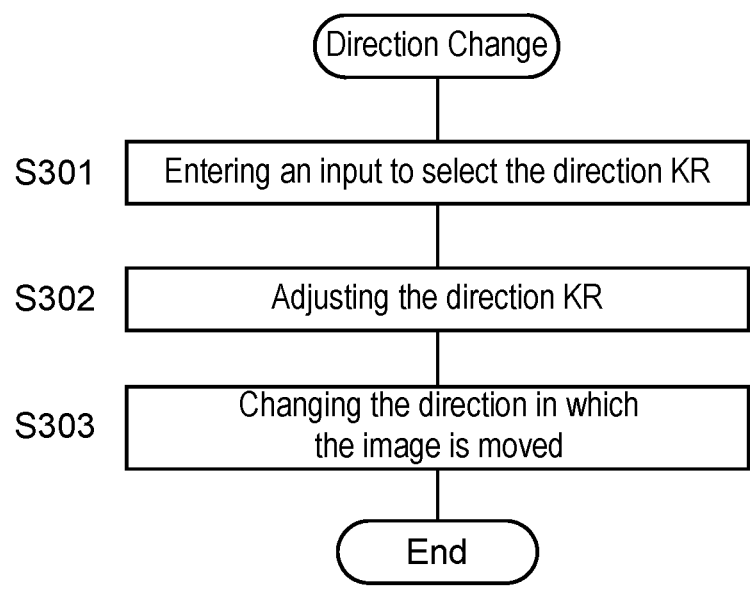
FIG. 12 is a flowchart of a process of changing the direction in which an image is moved in response to user input for instructing the direction in the image adjustment system shown in FIG. 11.
Figure 13A:
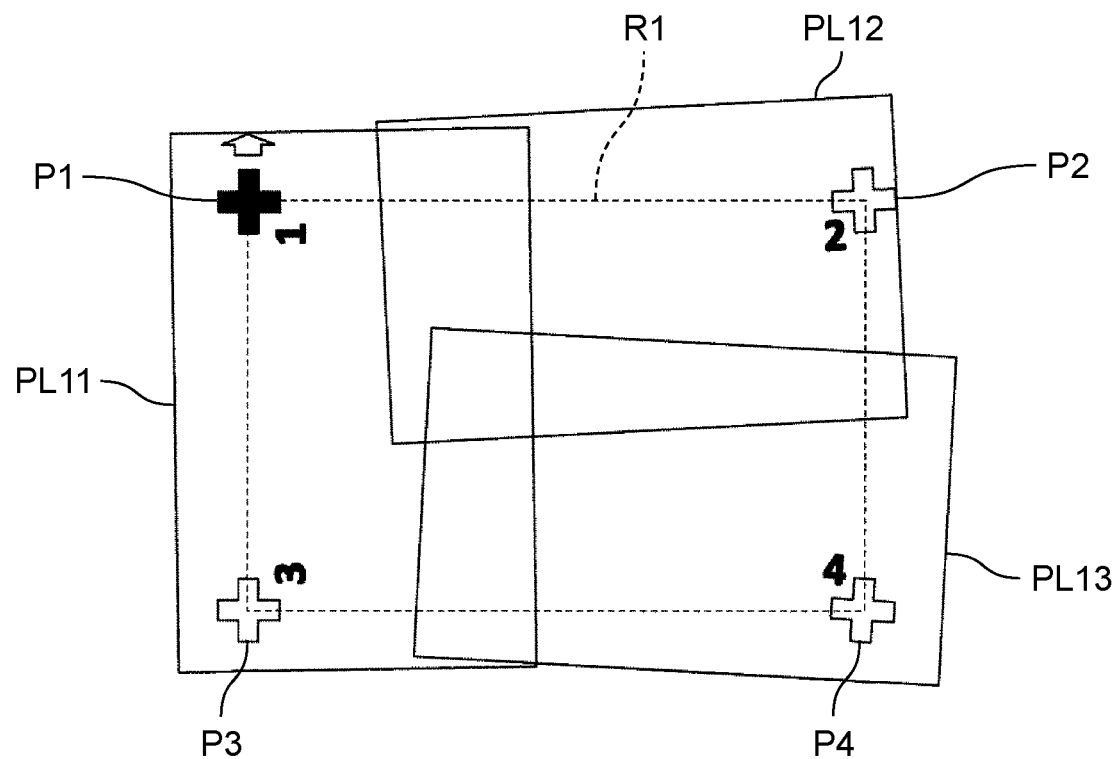
FIG. 13A is a schematic diagram of the direction in which the image is moved in response to the user input for instructing the direction before the direction changing process shown in FIG. 12 is performed.
Figure 13B:
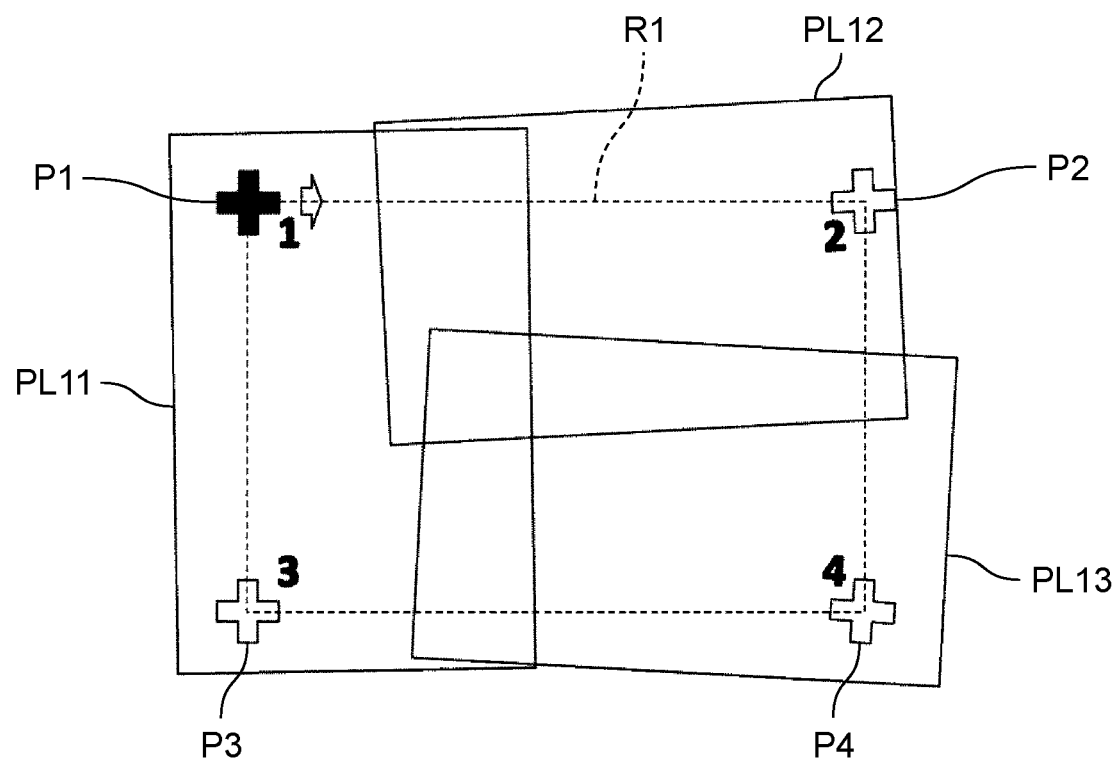
FIG. 13B is a schematic diagram of the direction in which the image is moved in response to the user input for instructing the direction after the direction changing process shown in FIG. 12 is performed.

FIG. 12 is a flowchart of a process of changing the direction in which an image is moved in response to user input for instructing the direction in the image adjustment system shown in FIG. 11. FIG. 13A is a schematic diagram of the direction in which the image is moved in response to the user input for instructing the direction before the direction changing process shown in FIG. 12 is performed. FIG. 13B is a schematic diagram of the direction in which the image is moved in response to the user input for instructing the direction after the direction changing process shown in FIG. 12 is performed.

The user operates input device 41 to input a direction KR (Step S301). The following description is based on the assumption that input device 41 is a keyboard, and that the user has pressed the right key. In this case, coordinate-conversion unit 34 of controller 31 assigns angle information to the direction KR entered through input device 41. The angle information is assigned, for example, as follows: 0° for the up key; 90° for the left key; 180° for the down key; and 270° for the right key. The user has pressed the right key, so that the direction KR is assigned with 270°.

Next, coordinate-conversion unit 34 adjusts the direction KR based on the first rotation information PR and the second rotation information CR (Step S302). The pointer image P1 is displayed by image projection device 11, so that the direction KR is adjusted to be KR+(CR−PR11), based on the first rotation information PR11 and the second rotation information CR. As a result, the direction KR is adjusted to be 158°, which is the result of 270°+(−10°-102°).

Coordinate-conversion unit 34 changes the direction in which the pointer image P1 is moved, based on the adjusted direction KR (Step S303). The direction of moving the pointer image P1 is changed based on the value of the adjusted direction KR. When the direction KR exceeds −45° and does not exceed 45°, the image P1 is moved just like when the up key is pressed. When the direction KR exceeds 45° and does not exceed 135°, the image P1 is moved just like when the left key is pressed. When the direction KR exceeds 135° and does not exceed 225°, the image P1 is moved just like when the down key is pressed. When the direction KR exceeds 225° and does not exceed 315°, the image P1 is moved just like when the right key is pressed. The direction KR is 158° in the present exemplary embodiment, so that the image P1 is moved rightward as shown in FIG. 13B, just like when the down key is pressed.

Before the direction changing process is performed, if the user operates input device 41 to move the pointer image P1 rightward, the image P1 is moved upward as shown in FIG. 13A. Meanwhile, after the direction changing process is performed, the image P1 is moved rightward as shown in FIG. 13B as desired by the user.

Display Switchover Process

The following is a description of an image display switchover process among the image projection devices when the image P1 is not fully displayed within the projection range PL11 of image projection device 11 as a result of being moved in response to the user input for instructing the direction.

Figure 14:
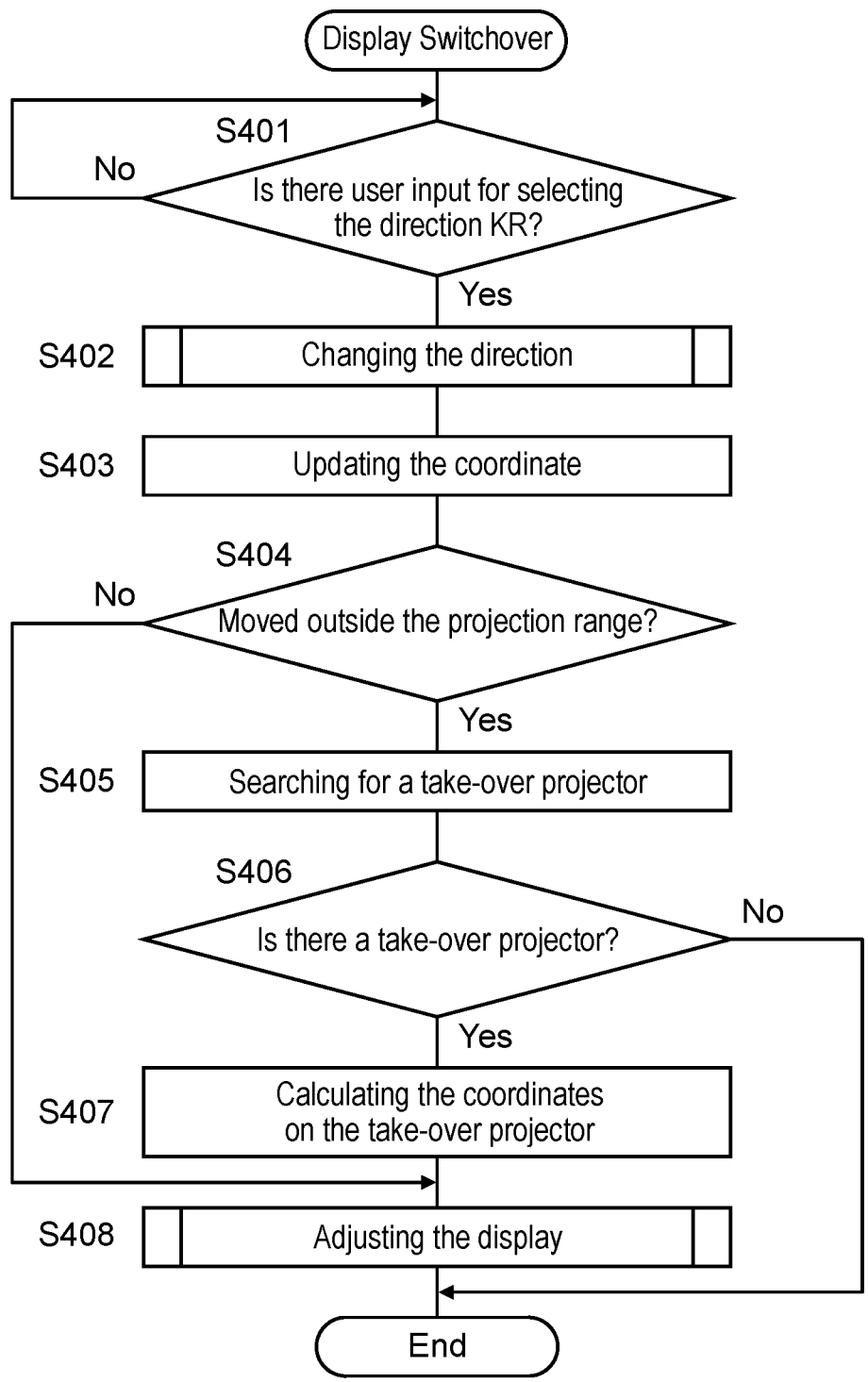
FIG. 14 is a flowchart of a display switchover process in the image adjustment system shown in FIG. 11.
Figure 15A:
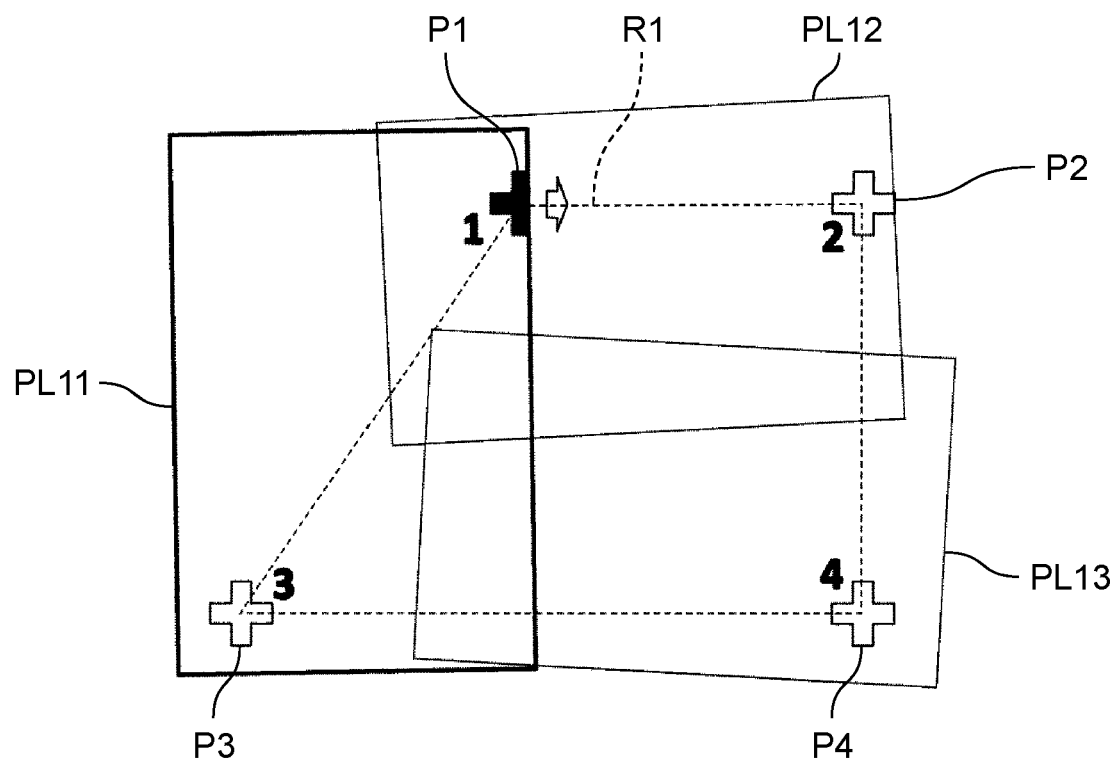
FIG. 15A is a schematic diagram of a pointer image before the display switchover process.
Figure 15B:
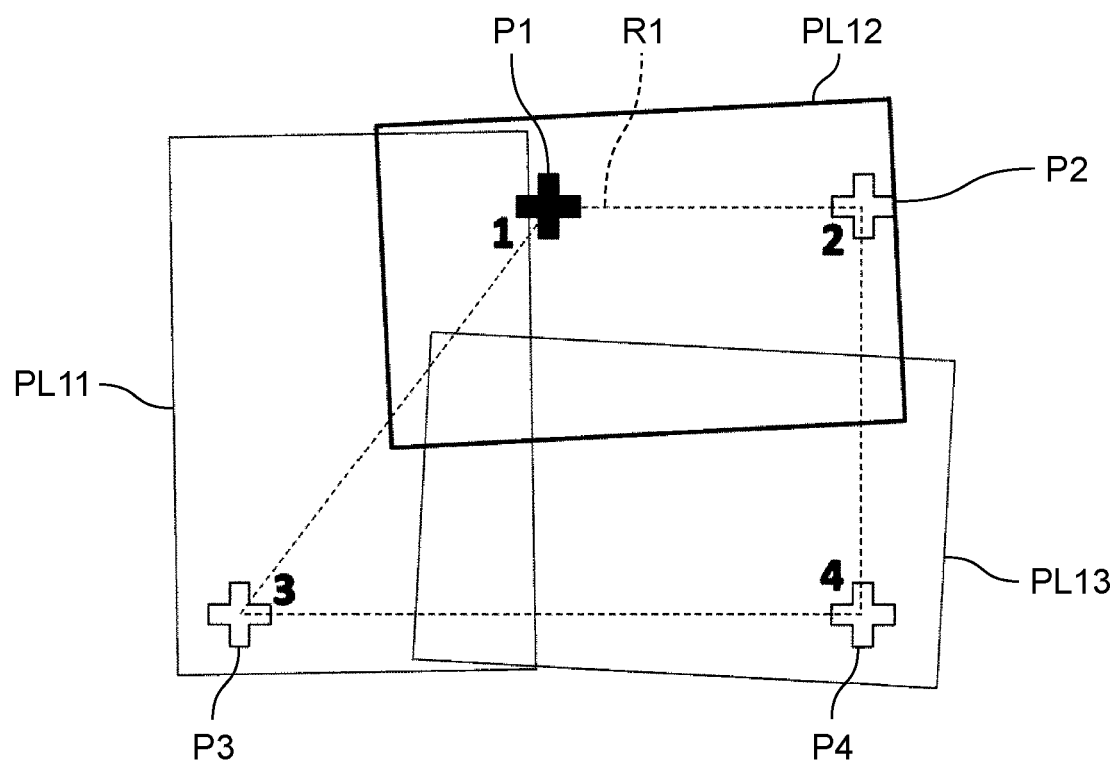
FIG. 15B is a schematic diagram of the pointer image after the display switchover process.

FIG. 14 is a flowchart of a display switchover process in image adjustment system 101 shown in FIG. 11. FIG. 15A is a schematic diagram of the pointer image P1 before the display switchover process. FIG. 15B is a schematic diagram of the pointer image P1 after the display switchover process.

Coordinate-conversion unit 34 determines whether input device 41 has received user input for instructing the direction KR (Step S401). When there is no user input for instructing the direction KR, the reception of such user input is waited for (No in Step S401). When there is such user input (Yes in Step S401), the above-mentioned direction changing process (see FIG. 12) is performed (Step S402). When the process is completed, the coordinate of the pointer image P1 is updated based on the adjusted direction KR (Step S403). Thus, the pointer image P1 is moved based on the adjusted direction KR.

Next, coordinate-conversion unit 34 determines whether the pointer image P1 has been moved outside the projection range of image projection device 11 (Step S404). Whether the image P1 has been moved outside the projection range can be determined by examining, for example, whether the projector coordinate of the center (not shown) of the image P1 is within the projection range PL11. Alternatively, whether the image P1 is within the projection range PL11 can be determined from any point of the image P1 instead of its center point.

When the pointer image P1 is displayed within the projection range PL11 of image projection device 11, the process proceeds to Step S408, which will be described later.

When the pointer image P1 is moved outside the projection range PL11 as shown in FIG. 15A (Yes in Step S404), coordinate-conversion unit 34 searches for a take-over projector, which can take over image projection device 11 and display the image P1 (Step S405). In the present exemplary embodiment, at least one of image projection devices 11 to 13 can be a take-over projector.

To search for a take-over projector, coordinate-conversion unit 34 first calculates a camera coordinate, based on the conversion information, from the projector coordinate of the center of the pointer image P1 in the projection range PL11 of image projection device 11. In other words, when part of the pointer image P1 in the range PL11 is moved outside the range PL11, coordinate-conversion unit 34 calculates the camera coordinate of the part of the image P1 based on the conversion information. The part of the image P1 can be a specific point or region of the displayed pointer image P1.

Next, the calculated camera coordinate is converted into a projector coordinate of image projection device 12 or 13 based on the conversion information in image projection device 12 or 13. For example, when the projector coordinate of image projection device 12 that has been converted from the camera coordinate of the center of the pointer image P1 is within the projection range PL12 of image projection device 12, image projection device 12 is detected as a take-over projector. Similarly, when the projector coordinate of image projection device 13 that has been converted from the camera coordinate of the center of the pointer image P1 is within the projection range PL13 of image projection device 13, image projection device 13 is detected as another take-over projector. Thus, of image projection devices 12 and 13, any image projection device whose projection range contains the camera coordinate of the center of the pointer image P1 is searched for based on conversion information.

If two or more take-over projectors are detected, one image projection device that takes over the display of the pointer image P1 can be determined according to a predetermined rule. For example, these image projection devices can be assigned with IDs and take over the image of the pointer image P1 in ascending order of IDs.

When coordinate-conversion unit 34 has detected no take-over projectors (No in Step S406), the process is terminated. When coordinate-conversion unit 34 detects a take-over projector (Yes in Step S406), the take-over projector calculates the coordinate of the pointer image P1 (Step S407). In the present exemplary embodiment, the camera coordinate of the center of the pointer image P1 is within the projection range PL12 as shown in FIG. 15B, so that image projection device 12 is defined to be the take-over projector.

In the take-over projector (image projection device 12), the coordinate of the pointer image P1 is calculated (Step S407). The coordinate of the pointer image P1 can be calculated by converting the camera coordinate of the center of the pointer image P1 into the projector coordinate of image projection device 12 based on conversion information. Furthermore, the display adjustment process described in the first exemplary embodiment is performed in image projection device 12 (Step S408), and the process is terminated. Thus, when the camera coordinate of the center is within the projection range PL12, the display of the pointer image P1 is switched over from image projection device 11 to image projection device 12.

Note that image projection device 11, image projection device 12, the projection range PL11, and the projection range PL12 of the present exemplary embodiment respectively correspond to "the first image projection device", "the second image projection device", "the first projection range", and "the second projection range" of the present disclosure.

Effects

According to the second exemplary embodiment thus described, the direction in which an image is moved can be aligned with the direction instructed by user input, allowing the user to operate intuitively, thereby improving the operability of the image adjustment system.

When the user moves a displayed image by operating a keyboard, a mouse, or other tools, the direction in which the image is moved may differ from the direction instructed by the user, depending on the orientation of the image projection device. In such cases, image coordinates can be converted based on the camera coordinates and the projector coordinates of the image projection devices. This enables moving the image across the projection ranges of the image projection devices, thereby improving the image visibility.

The pointer images P1 to P4 are in the shape of crisscrosses in the second exemplary embodiment, but may be in other shapes.

Third Exemplary Embodiment

A third exemplary embodiment will now be described with reference to FIGS. 16A to 16B. In the third exemplary embodiment, components identical to those in the first exemplary embodiment are denoted by the same reference numerals, and their description will be omitted.

Figure 16A:
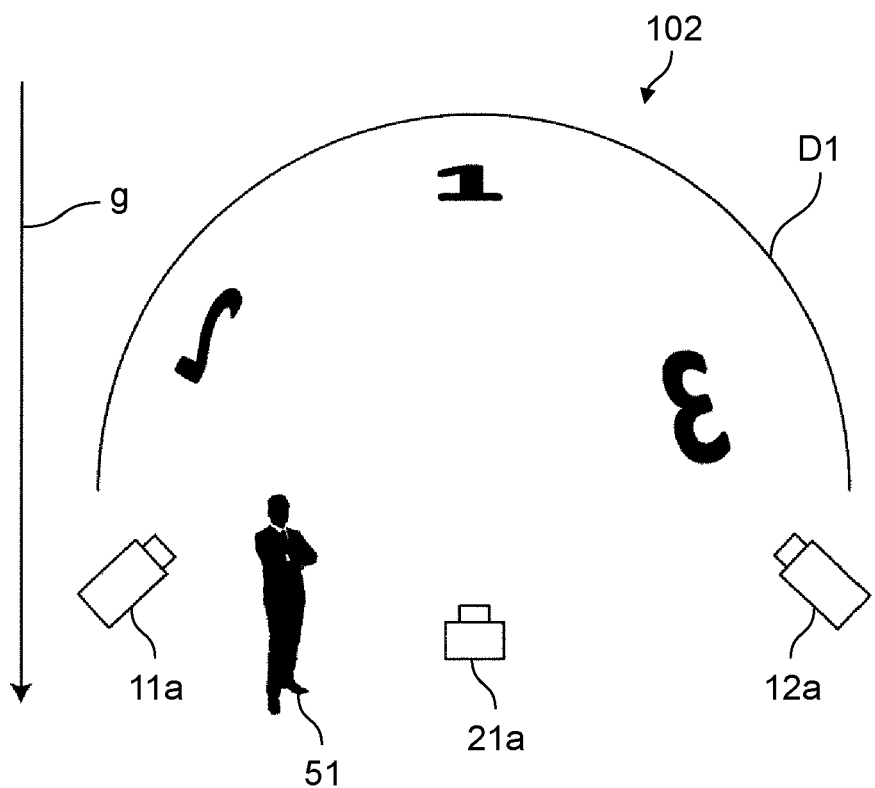
FIG. 16A is a schematic diagram of the image adjustment system according to a third exemplary embodiment.

FIG. 16A is a schematic diagram of image adjustment system 102 according to the third exemplary embodiment. FIG. 16B shows the captured image CL2 obtained by imaging device 21a of the image adjustment system shown in FIG. 16A.

The third exemplary embodiment differs from the first exemplary embodiment in that vides are projected onto a dome-shaped screen D1. The screen D1 is oriented toward the zenith in the third exemplary embodiment.

In the present exemplary embodiment, imaging device 21a has, for example, a fish-eye lens. Imaging device 21a is placed so that the lens is oriented toward the zenith as shown in FIG. 16A. In the captured image CL2 obtained by imaging device 21a, the circumference of a circle C1 is the outer periphery of the screen D1 as shown in FIG. 16B. In this case, the orientations of images projected by image projection devices 11a and 12a are adjusted so that the center of the circle C1 is above an observer 51 and that the circumference of the circle C1 is below the observer 51. In other words, the vertical direction "g" shown in FIG. 16A is regarded to be radially projected from the center of the circle C1 in the captured image CL2.

Figure 16B:
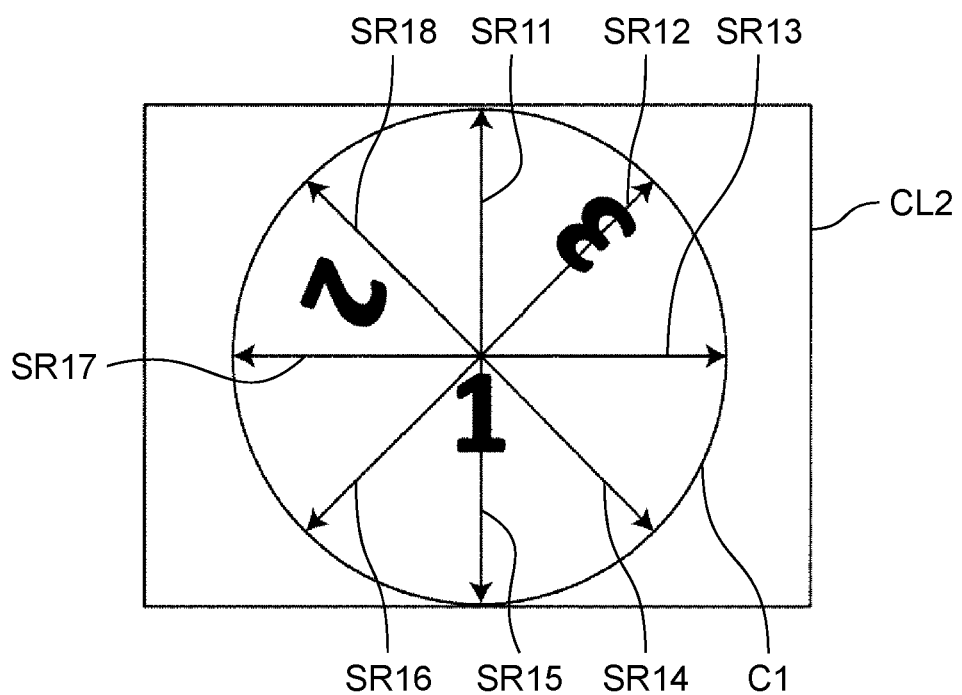
FIG. 16B shows a captured image obtained by the imaging device of the image adjustment system shown in FIG. 16A.

Thus, in the present exemplary embodiment, eight arrows extending radially from the center of the circle C1 correspond to first reference orientations SR 11 to SR18 each representing the vertical direction in the screen D1 as shown in FIG. 16B. Image display is adjusted based on these orientations SR 11 to SR18, which are contained within the projection range of image projection device 11a or 12a.

For example, when the projection range of image projection device 11a or 12 contains the first reference orientations SR 11 to SR18, image display can be adjusted so that the orientations of the images are in a predetermined relation with the first reference orientation that is located at the center of the projection range. Alternatively, a projection range may be divided into regions each containing one first reference orientation, and image display may be adjusted so that the orientations of the images are in a predetermined relation with the first reference orientation in each of the regions.

Effects

According to the present exemplary embodiment, images can be projected with high visibility even when image projection devices have different reference orientations from each other, such as the case where images are projected onto the dome-shaped screen D1 oriented toward the zenith.

The number of the lines (representing the first reference orientations SR 11 to SR18 in the present exemplary embodiment) extending radially from the center of the circle C1 is not limited to eight, and can be increased or decreased depending on the number of image projection devices used.

Fourth Exemplary Embodiment

A fourth exemplary embodiment will now be described with reference to FIGS. 17A and 17B. In the fourth exemplary embodiment, components identical to those in the third exemplary embodiment are denoted by the same reference numerals, and their description will be omitted.

Figure 17A:
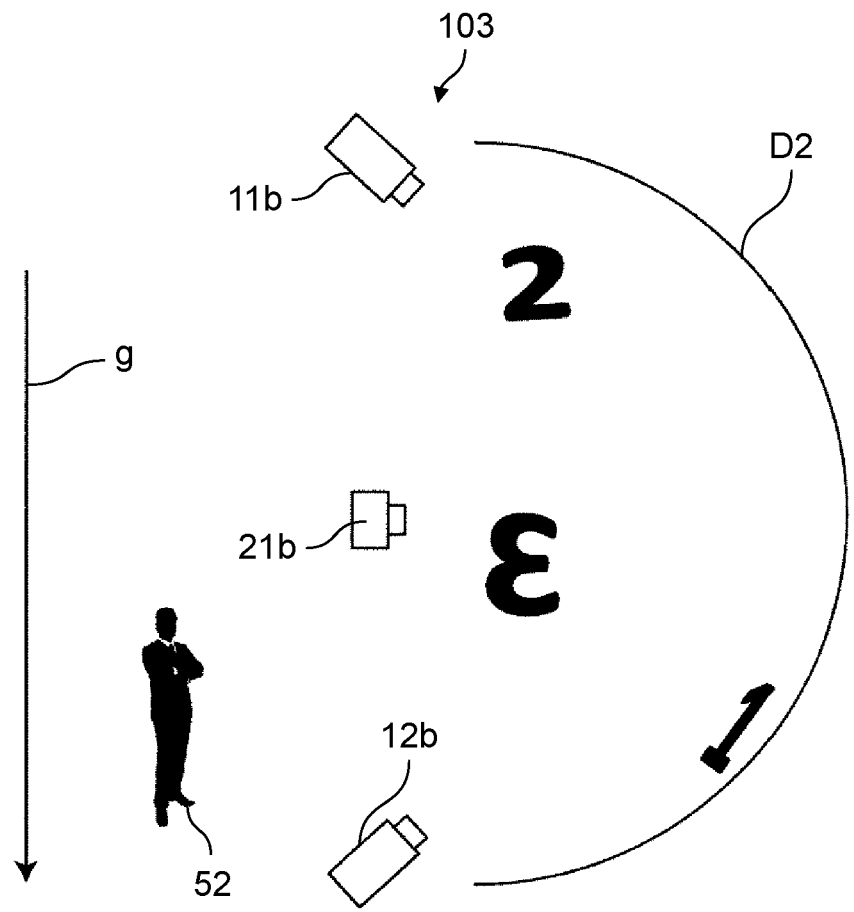
FIG. 17A is a schematic diagram of the image adjustment system according to a fourth exemplary embodiment.
Figure 17B:
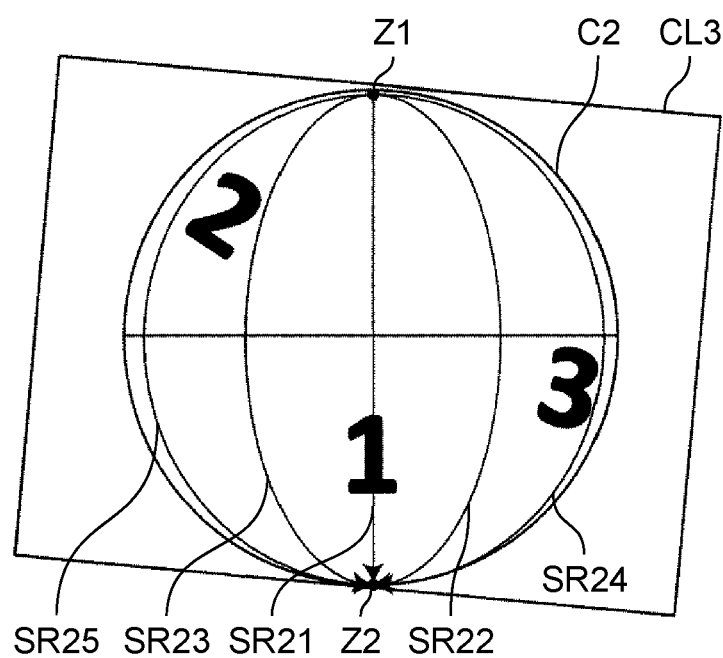
FIG. 17B shows a captured image obtained by the imaging device of the image adjustment system shown in FIG. 17A.

FIG. 17A is a schematic diagram of image adjustment system 103 according to the fourth exemplary embodiment. FIG. 17B shows a captured image CL3 obtained by imaging device 21b of system 103.

The fourth exemplary embodiment differs from the third exemplary embodiment in that the dome-shaped screen D2 is oriented toward the horizontal direction.

In the present exemplary embodiment, imaging device 21b having, for example, a fish-eye lens is oriented toward the horizontal direction as shown in FIG. 17A. In the captured image CL3 obtained by imaging device 21b, the circumference of a circle C2 is the outer periphery of the screen D2 as shown FIG. 17B. In this case, the top Z1 of the circle C2 is defined as the zenith whereas the top Z2 on the opposite side through the center of the circle C2 is defined as the nadir. Image display is adjusted so that the top Z1 is above an observer 52 and the top Z2 is below the observer 52. The vertical direction "g" is regarded to be projected onto an elliptic arc extending from the top Z1 to the top Z2 in the captured image CL3.

Thus, in the present exemplary embodiment, a straight line (representing a first reference orientation SR21) extending from the top Z1 to the top Z2 of the circle C2, and curves (representing first reference orientations SR22 to SR25) extending from the top Z1 to the top Z2 correspond to the first reference orientations representing the vertical direction of the screen D2. Image display is adjusted based on the first reference orientations SR21 to SR25 contained within the projection ranges of image projection devices 11b and 12b.

Effects

According to the present exemplary embodiment thus described, images can be projected with high visibility even when image projection devices have different reference orientations from each other, such as the case where images are projected onto the dome-shaped screen D2 oriented toward the horizontal direction.

The present disclosure is applicable to various uses where a plurality of image projection devices are used together to project images.

What is claimed is:

1. An image adjustment system comprising:
 a plurality of image projection devices configured to respectively project a plurality of images in a plurality of projection ranges;
 an imaging device configured to capture a region containing the plurality of projection ranges to obtain a captured image; and
 a controller configured to control the plurality of image projection devices and the imaging device, the controller being configured to:
  calculate first rotation information representing an orientation of each of the plurality of images with respect to a first reference orientation of the captured image, and
  adjust display of each of the plurality of images based on the first rotation information to cause the orientation and the first reference orientation to be in a predetermined relation with each other.

2. The image adjustment system according to claim 1, wherein
 the controller is further configured to:
  generate, based on the first rotation information, mapping information of a projector coordinate of each of the plurality of image projection devices, and a camera coordinate of the imaging device, and
  generate, based on the mapping information, conversion information for converting the projector coordinate into the camera coordinate.

3. The image adjustment system according to claim 2, further comprising an input device configured to receive input for instructing a direction,
 wherein the controller changes, based on the input and the conversion information, the direction instructed by the input.

4. The image adjustment system according to claim 3, wherein
 the plurality of image projection devices include a first image projection device and a second image projection device,
 the plurality of projection ranges include a first projection range of the first image projection device and a second projection range of the second image projection device, and
 the controller is configured to:
  calculate, when a partial image in the first projection range is moved outside the first projection range as a result of the input, a camera coordinate of the partial image in the imaging device based on the conversion information,
  search for, based on the conversion information, one image projection device of the plurality of image projection devices, the one image projection device containing the camera coordinate of the partial image in a corresponding projection range of the plurality of projection ranges, and
  switch over, when the camera coordinate of the partial image is within the second projection range, display of the partial image from the first image projection device to the second image projection device.

5. The image adjustment system according to claim 2, wherein
 the imaging device includes a sensor configured to detect a tilt of the imaging device with respect to a second reference orientation different from the first reference orientation, and the controller is configured to:

calculate second rotation information based on the second reference orientation and the tilt, and generate the conversion information based on the first rotation information and the second rotation information.

6. The image adjustment system according to claim 1, wherein the controller adjusts the display of each of the plurality of images to cause the orientation and the first reference orientation agree with each other.

7. An image adjustment device for adjusting display of each of a plurality of images respectively projected in a plurality of projection ranges by a plurality of image projection devices, the image adjustment device comprising:

a calculation unit configured to calculate first rotation information representing an orientation of each of the plurality of image with respect to a first reference orientation in a captured image, the captured image being obtained by an imaging device when the imaging device captures a region containing the plurality of projection ranges; and an image adjustment unit configured to adjust, based on the first rotation information, display of each of the plurality of images to cause the orientation and the first reference orientation to be in a predetermined relation with each other.

8. The image adjustment device according to claim 7, further comprising:

a mapping unit configured to generate, based on the first rotation information, mapping information of a projector coordinate of each of the plurality of image projection devices and a camera coordinate of the imaging device; and a coordinate-conversion unit configured to generate, based on the mapping information, conversion information for converting the projector coordinate into the camera coordinate.

* * * * *